(12) United States Patent
Jung et al.

(10) Patent No.: US 8,308,467 B2
(45) Date of Patent: Nov. 13, 2012

(54) PARALLELISM CONTROL APPARATUS FOR MOVING PLATEN OF ELECTRICALLY DRIVEN INJECTION MOLDING MACHINE

(75) Inventors: Jin Won Jung, Hwaseong-si (KR); Kyong Ho Park, Seoul (KR); Sung Chul Yoo, Anyang-si (KR)

(73) Assignee: LS Mtron Ltd., Anyang-si, Gyeonggi-do (KR)

( * ) Notice: Subject to any disclaimer, the term of this patent is extended or adjusted under 35 U.S.C. 154(b) by 0 days.

(21) Appl. No.: 13/196,223

(22) Filed: Aug. 2, 2011

(65) Prior Publication Data

US 2012/0258193 A1    Oct. 11, 2012

(51) Int. Cl.
*B29C 45/17*     (2006.01)
(52) U.S. Cl. ........................................ 425/190; 425/589
(58) Field of Classification Search .................. 425/190, 425/575, 589
See application file for complete search history.

(56) References Cited

U.S. PATENT DOCUMENTS

| 4,571,169 A | * | 2/1986 | Shima et al. | 425/589 |
| 6,652,264 B2 | * | 11/2003 | Yokoya et al. | 425/575 |
| 7,168,946 B2 | * | 1/2007 | Koike et al. | 425/595 |
| 7,217,116 B2 | * | 5/2007 | Nishimura et al. | 425/190 |
| 7,241,133 B2 | * | 7/2007 | Wang | 425/575 |

FOREIGN PATENT DOCUMENTS

JP    2000-296541    * 10/2000

* cited by examiner

*Primary Examiner* — James Mackey
(74) *Attorney, Agent, or Firm* — Sherr & Jiang, PLLC

(57) ABSTRACT

Provided is a parallelism control apparatus of a movable platen of an electric injection molding machine, to which a new arrangement type using a wedge to control the parallelism of a movable platen is applied to reduce the size of the parallelism control apparatus, ensure an installation space, and solve a difficulty during installation, which ensures rigidity of the movable platen in directions of forward and rearward movements, and enables parallelism adjustment and firm position fixing by controlling a vertical amount, a horizontal amount, and a combination of vertical and horizontal amounts even in a narrow space, thereby further enhancing precision and quality reliability of molded products.

1 Claim, 4 Drawing Sheets

PARALLELISM CONTROL APPARATUS FOR MOVING PLATEN OF ELECTRICALLY DRIVEN INJECTION MOLDING MACHINE

CROSS-REFERENCE TO RELATED APPLICATION

This application claims priority to Korean Patent Application No. 2011-31037, filed on Apr. 5, 2011, and all the benefits accruing therefrom under 35 U.S.C. §119, the contents of which in its entirety are herein incorporated by reference.

BACKGROUND

1. Field

The present disclosure relates to a parallelism control apparatus of a movable platen of an electric injection molding machine, and more particularly, to a parallelism control apparatus which uses a wedge to control the parallelism of a movable platen and to which a new arrangement type of wedge is applied, thereby reducing the size of the parallelism control apparatus and solving a difficulty during installation.

Moreover, rigidity of the movable platen in directions of forward and rearward movements is ensured, and parallelism adjustment and firm position fixing are enabled by controlling a vertical amount, a horizontal amount, and a combination of vertical and horizontal amounts even in a narrow space, thereby further enhancing precision and quality reliability of molded products.

2. Description of the Related Art

In general, an electric injection molding machine mainly includes an injection apparatus and a platen apparatus. A movable platen included in the platen apparatus performs an opening and closing operation with a stationary platen of which the position is fixed while the movable platen is guided along a tie bar, that is, performs a mold opening operation and a mold closing operation.

In addition, the ordinary electric injection molding machine employs an electric motor transporting apparatus which typically uses a ball screw to rapidly perform the opening and closing operation of the movable platen. When the parallelism of the movable platen is re-adjusted after such a ball screw is employed, straightness of the ball screw is deteriorated.

Accordingly, in order to solve the problem with the deterioration of the straightness of the ball screw, a structure in which the ball screw is fixed to a frame, a support plate which moves along the ball screw and a guide rail which guides the support plate are installed, and a base plate is placed on the top surface of the support plate to support the movable platen is applied.

As such, when the ball screw, the electric motor transporting apparatus, the frame, the support plate, and associated fixing and connecting components are mounted, a space for installing a parallelism control mechanism for the movable platen cannot be sufficiently ensured, and accordingly, a parallelism control mechanism capable of controlling the parallelism only in a particular direction is limitedly installed.

When the parallelism control mechanism for the movable platen is limitedly installed to control the parallelism only in particular directions as described above, there is a limitation to a levelness adjustment direction of the movable platen, so that precision cannot be enhanced. In addition, since the mechanism has a structure in which the parallelism is adjusted only in particular directions, the levelness of the movable platen is deteriorated during molding or opening and closing operations of the movable platen. Therefore, there is a problem in that precision and quality reliability of molded products are degraded.

SUMMARY

This disclosure provides a parallelism control apparatus which uses a wedge to control the parallelism of a movable platen and to which a new arrangement type of wedge is applied, thereby reducing the size of the parallelism control apparatus and solving a difficulty during installation. This disclosure also provides a parallelism control apparatus which ensures rigidity of the movable platen in directions of forward and rearward movements and enables parallelism adjustment and firm position fixing by controlling a vertical amount, a horizontal amount, and a combination of vertical and horizontal amounts even in a narrow space, thereby further enhancing precision and quality reliability of molded products.

In one aspect, there is provided a parallelism control apparatus of a movable platen of an electric injection molding machine, wherein bottom surfaces of base plates which are disposed under bottom surfaces of both sides of the movable platen to support the movable platen are placed on support plates, and the movable platen performs an opening and closing operation as the support plates are slidably moved along guide rails, the parallelism control apparatus including: a first wedge which includes an inclined portion that is fitted while being inserted between the base plate and the support plate, and a side surface portion provided on one side of the inclined portion; a spiral bar which is fastened to the base plate while penetrating the side surface portion so that the first wedge is disposed to place an inclined surface of the inclined portion on any one of inclined surfaces of the base plate and the support plate; and position control fastening pieces which are fastened to the spiral bar on both sides of the side surface portion.

The parallelism control apparatus may further include: fixed blocks which are respectively disposed on both sides of a virtual region of the support plate on which the base plate is placed and are fixed to the support plate while facing the base plate; a second wedge which includes an inclined portion that is fitted while being vertically disposed and inserted between the fixed block and the base plate, and a side surface portion provided on one side of the inclined portion; a spiral bar which is fastened to the fixed block while penetrating the side surface portion so that the second wedge is disposed to place an inclined surface of the inclined portion on any one of inclined surfaces of the fixed block and the base plate; and position control fastening pieces which are fastened to the spiral bar on both sides of the side surface portion.

The support plate may be provided with a passage into which the second wedge enters during a downward movement.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
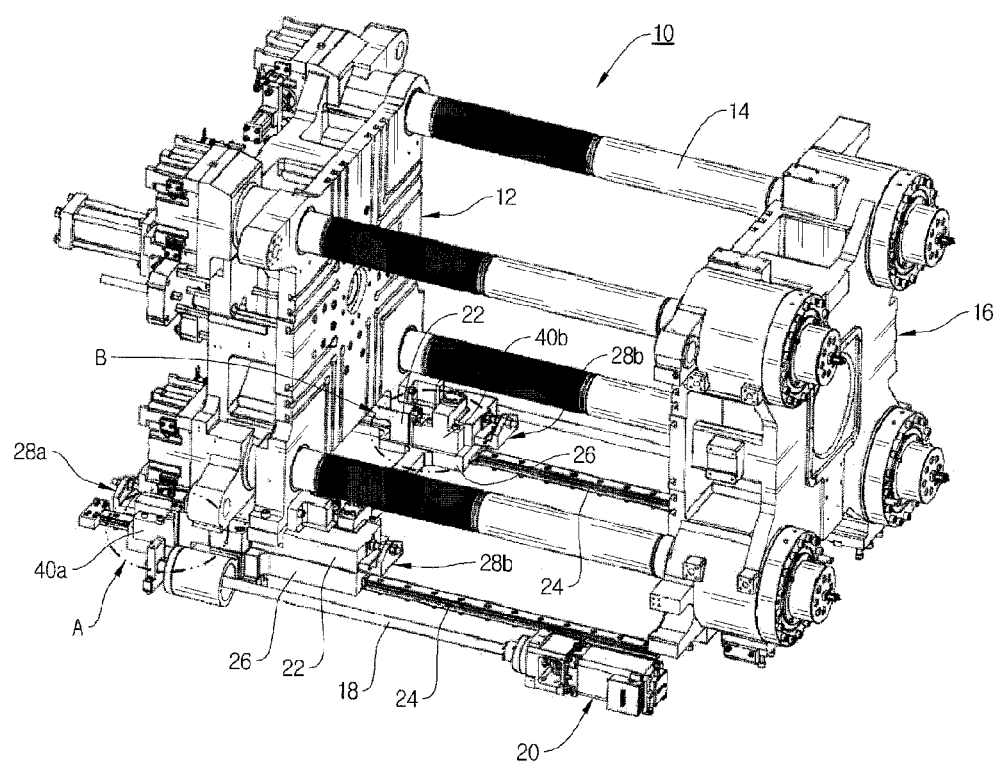
FIG. 1 is a perspective view showing a parallelism control apparatus according to an embodiment which is installed in a movable platen of an ordinary electric injection molding machine.
Figure 2:
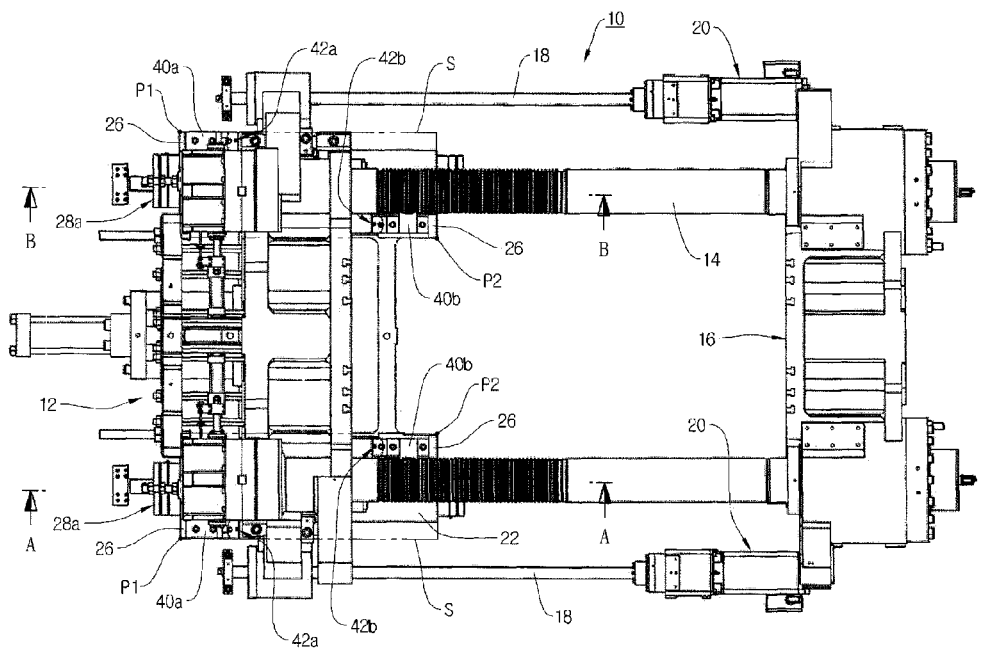
FIG. 2 is a schematic top view of FIG. 1.
Figure 3:
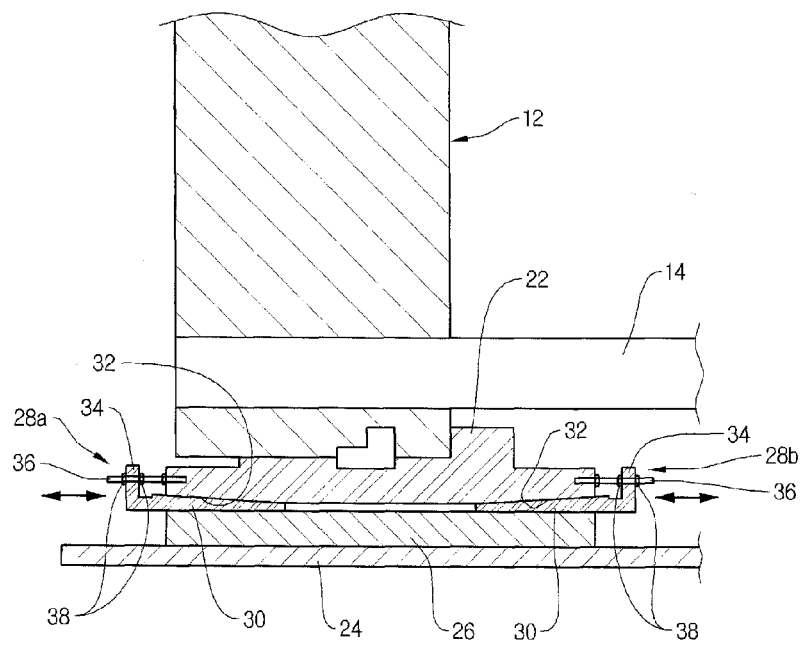
FIG. 3 is a schematic cross-sectional view taken along the lines A-A and B-B of FIG. 2.
Figure 4:
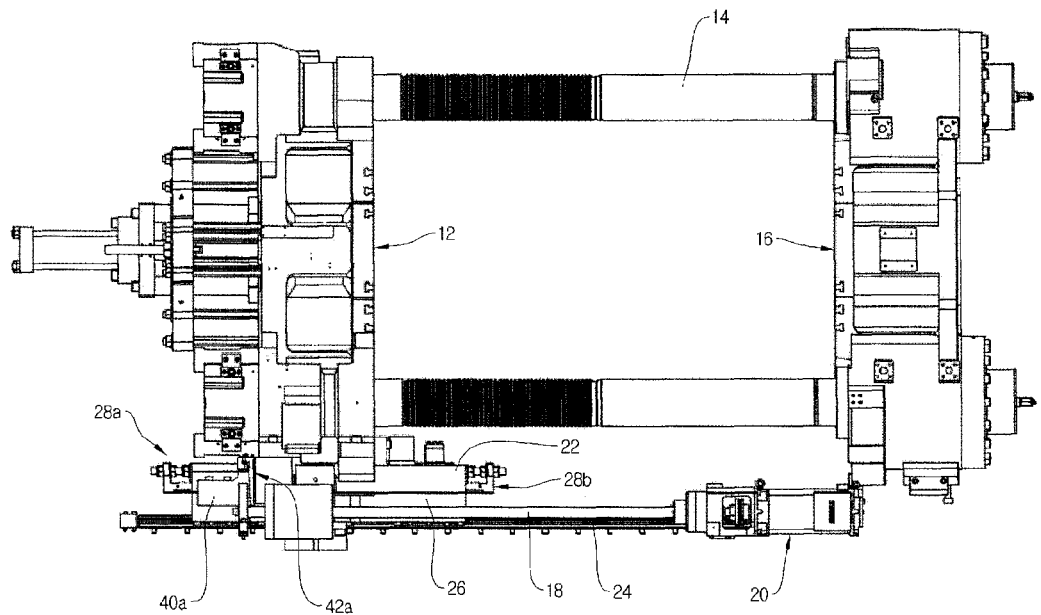
FIG. 4 is a schematic side view of FIG. 1.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

Exemplary embodiments of a parallelism control apparatus of a movable platen of an electric injection molding machine will now be described in detail with reference to the attached drawings. In the description, since a movable platen, a stationary platen, a tie bar, a ball screw, an electric motor transporting apparatus, a base plate, a support plate, a guide rail, and structures of combining them are well known, detailed description of the well-known techniques will be omitted so as not to hinder the essential of the embodiments.

As shown in FIG. 1, as mentioned above in the description of the related art, in an electric injection molding machine 10, a movable platen 12 performs an opening and closing operation with a stationary platen 16, that is, a molding opening operation and a mold closing operation, while being guided along a tie bar 14. In order to perform such an opening and closing operation, ball screws 18 and electric motor transporting apparatus 20 are employed on both sides of the movable platen 12.

In addition, a general structure in which base plates 22 disposed on both the sides to support the bottom surfaces of both sides of the movable platen 12 are placed on the top surfaces of support plates 26 which are disposed under the base plates 22 and slidably move along guide rails 24 is employed.

According to this embodiment, as shown in FIGS. 1 to 4, first wedges 28a and 28b formed in triangular shapes are respectively disposed at front ends of both the sides between the base plates 22 and the support plates 26. When the first wedges 28a and 28b are inserted between the base plates 22 and the support plates 26, the first wedges 28a and 28b are disposed so that an inclined surface 32 of the base plate 22 is put on the inclined surface of an inclined portion 30 of each of the first wedges 28a and 28b and a side surface portion 34 provided on one side of the inclined portion 30 is disposed to be exposed (see FIG. 3).

In addition, a spiral bar 36 is fastened to the base plate 22, between the side surface portion 34 of each of the first wedges 28a and 28b which is disposed on the outside and the side surface of the base plate 22, while the spiral bar 36 penetrates the side surface portion 34. Position control fastening pieces 38 are fastened to the spiral bar 36 on both sides of the side surface portion 34 (see FIG. 3).

When setting of the positions of the first wedges 28a and 28b is completed, the position control fastening pieces 38 shows a function of holding the first wedges 28a and 28b so as not to enable the first wedges 28a and 28b to freely move along the spiral bar 36.

According to an amount of movement by which the first wedges 28a and 28b moving along the spiral bar 36 are inserted in an inward direction or pulled in an outward direction, the movable platen 12 moves in the vertical direction due to the structure of the inclined portions 30 of the first wedges 28a and 28b, and by this movement, a vertical amount can be controlled.

Meanwhile, as shown in FIGS. 1, 2, and 4 to 6, at edge points P1 and P2 that are diagonally disposed in a virtual region S of the support plate 26 on which the base plate 22 is put, fixed blocks 40a and 40b are fixed to the support plate 26 while facing the side surfaces of the base plate 22 in the vicinity thereof.

In addition, between the fixed blocks 40a and 40b and the base plate 22 in the rectangular virtual region S, second wedges 42a and 42b having the same structures as those of the first wedges 28a and 28b are respectively disposed.

Specifically, the second wedges 42a and 42b are vertically disposed between the fixed blocks 40a and 40b and the base plate 22. Each of the second wedges 42a and 42b includes an inclined portion 44 fitted while being inserted and a side surface portions 46a and 46b on one side of the inclined portion 44. The second wedges 42a and 42b are disposed so that the inclined surfaces 48a and 48b of the fixed blocks 40a and 40b come in contact with the inclined surfaces of the inclined portions 44 (see FIGS. 5 and 6).

Figure 5:
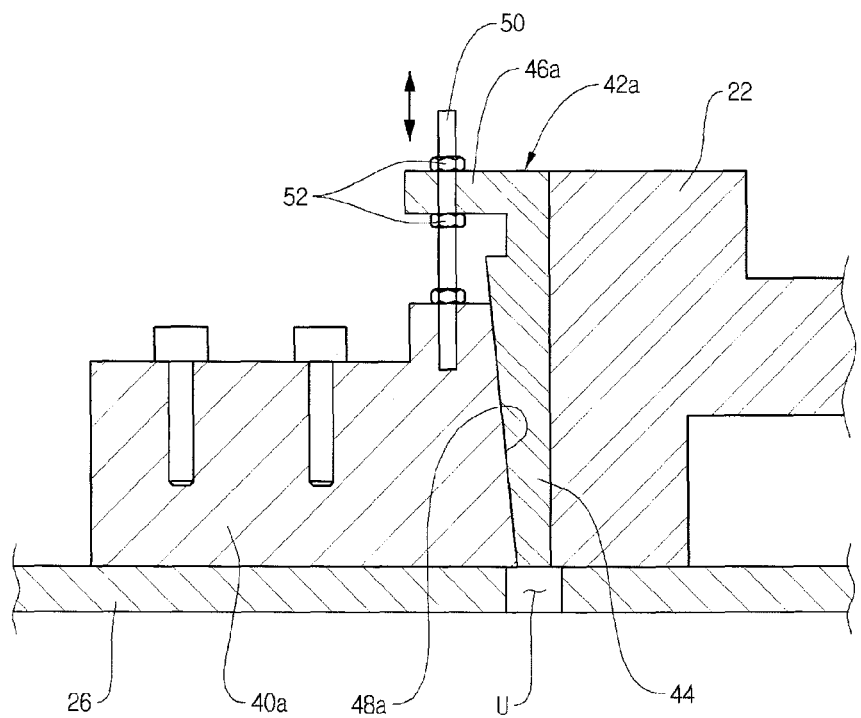
FIG. 5 is an enlarged cross-sectional view of the main portion of the part A of FIG. 1.
Figure 6:
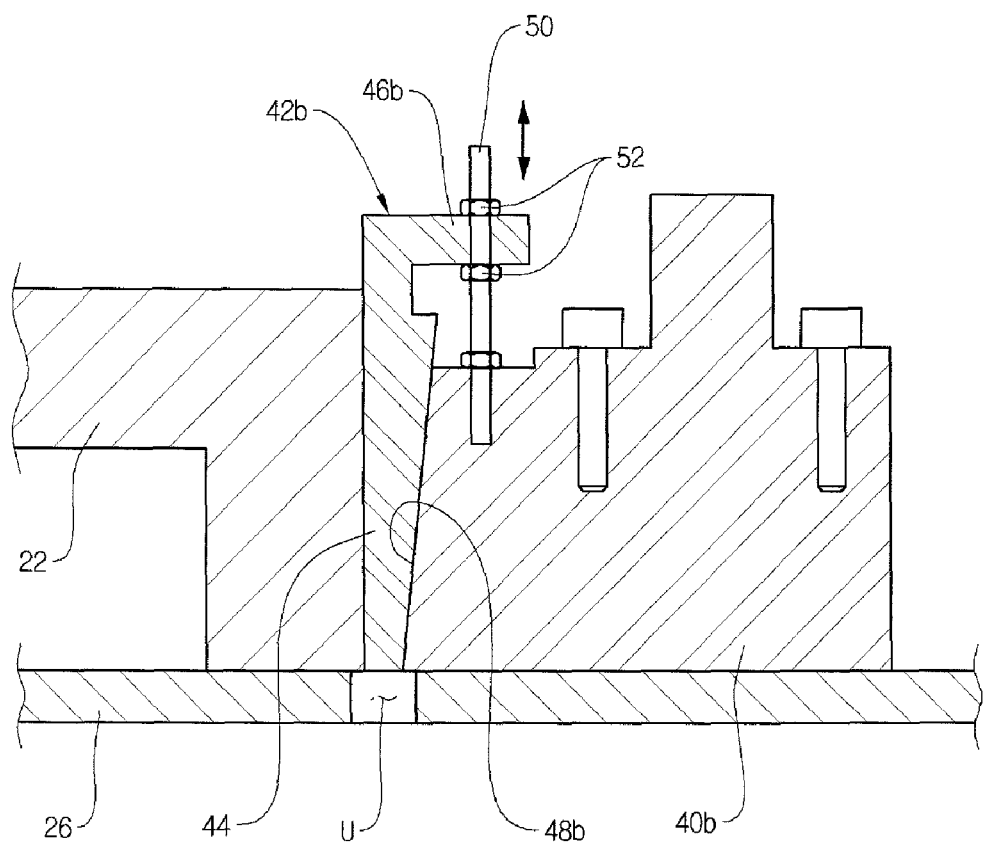
FIG. 6 is an enlarged cross-sectional view of the main portion of the part B of FIG. 1.

Spiral bars 50 are fastened to the fixed blocks 40a and 40b while penetrating the corresponding side surface portions 46a and 46b, and position control fastening pieces 52 for preventing the second wedges 42a and 42b from freely moving along the spiral bars 50 after position setting of the second wedges 42a and 42b are fastened to the spiral bars 50 on both sides of the side surface portions 46a and 46b (see FIGS. 5 and 6).

Meanwhile, so as to prevent blocking of a downward movement of the second wedges 42a and 42b by the support plate 26 during the downward movement, a portion of the support plate 26 corresponding to each of the second wedges 42a and 42b is provided with a passage U into which the second wedges 42a and 42b enter during the downward movement (see FIGS. 5 and 6).

According to amounts of movements by which the second wedges 42a and 42b are inserted in the downward direction or pulled in the upward direction while moving along the corresponding spiral bars 50, the horizontal movements of the fixed blocks 40a and 40b and the base plate 22 placed on the support plate 26 are made. Accordingly, the horizontal movement of the movable platen 12 can be controlled by controlling the horizontal amount of the base plate 22.

Furthermore, when it is assumed that control of the vertical amount described above is performed in the Y-axis direction and control of the horizontal amount is performed in the X-axis direction, if the controls of the vertical amount and the horizontal amount are combined, control of the movable platen 12 in the Z-axis direction in addition to a rotation direction thereof can be made. Accordingly, even though an installation space for the parallelism control mechanism is not sufficiently ensured, control of the parallelism of the movable platen 12 can be sufficiently performed.

In addition, a pair from among the first and second wedges 28a, 28b, 42a, and 42b forms a group to be symmetrically or diagonally disposed, so that the position of the base plate 22 on which the movable platen 12 is placed can be firmly fixed. Accordingly, deterioration of the parallelism of the movable platen 12 during the opening and closing operation and the molding operation is prevented, thereby further enhancing precision and quality reliability of molded products.

While this disclosure has been described with reference to the embodiments and drawings, this disclosure is not limited to them. For example, in the figures, the base plate 22 is illustrated to be placed on the inclined surface of the inclined portion 30 of the first wedges 28a and 28b. However, this disclosure is not limited to this arrangement, and the top surface of the support plate 26 may be provided with the same inclined surface as the inclined surface 32 of the base plate 22 to come in contact with the inclined surface of the inclined portion 30 of the first wedges 28a and 28b. In addition, the inclined surface of the inclined portion 44 of the second wedges 42a and 42b is illustrated to come in contact with the fixed blocks 40a and 40b. However, this disclosure is not limited to this arrangement, and the side surface of the base plate 22 may be provided with the same inclined surface as the inclined surfaces 48a and 48b of the fixed blocks 40a and 40b so that the inclined surface comes in contact with the inclined surface of the inclined portion 44 of each of the second wedges 42a and 42b.

As described above, in the parallelism control apparatus of the movable platen of the electric injection molding machine according to the present disclosure, since a new arrangement type using the wedge to control the parallelism of the movable platen is applied, effects of reducing the size of the parallelism control apparatus, ensuring an installation space, and solving all difficulties during installation can be expected.

In addition, when the parallelism control apparatus of the movable platen of the electric injection molding machine according to the present disclosure is used, rigidity of the movable platen in directions of forward and rearward movements is ensured, and parallelism adjustment and firm position fixing are enabled by controlling a vertical amount, a horizontal amount, and a combination of vertical and horizontal amounts even in a narrow space. Therefore, effects of further enhancing precision and quality reliability of molded products can be expected.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A parallelism control apparatus of a movable platen of an electric injection molding machine,
    wherein, bottom surfaces of base plates which are disposed under bottom surfaces of both sides of the movable platen to support the movable platen are placed on support plates, and the movable platen performs an opening and closing operation as the support plates are slidably moved along guide rails,
    the parallelism control apparatus includes:
    a first wedge which includes a first inclined portion that is fitted while being inserted between the base plate and the support plate, and a first side surface portion provided on one side of the first inclined portion;
    a first spiral bar which is fastened to the base plate while penetrating the first side surface portion so that the first wedge is disposed to place a first inclined surface of the first inclined portion on any one of inclined surfaces of the base plate and the support plate;
    position control fastening pieces which are fastened to the first spiral bar on both sides of the first side surface portion;
    a fixed block which is disposed on the support plate and fixed to the support plate while facing the base plate;
    a second wedge which includes a second inclined portion that is fitted while being vertically disposed and inserted between the fixed block and the base plate, and a second side surface portion provided on one side of the second inclined portion;
    a second spiral bar which is fastened to the fixed block while penetrating the second side surface portion so that the second wedge is disposed to place a second inclined surface of the second inclined portion on an inclined surface of the fixed block; and
    position control fastening pieces which are fastened to the second spiral bar on both sides of the second side surface portion,
    wherein the support plate is provided with a passage into which the second wedge enters during a downward movement.

* * * * *